United States Patent
Piltz

(10) Patent No.: US 8,328,440 B2
(45) Date of Patent: Dec. 11, 2012

(54) MULTI-DIRECTIONAL CAMERA MOUNT DEVICE FOR A COMPOUND BOW

(76) Inventor: Brian Piltz, Rancho Santa Margarita, CA (US)

( * ) Notice: Subject to any disclaimer, the term of this patent is extended or adjusted under 35 U.S.C. 154(b) by 418 days.

(21) Appl. No.: 12/765,668

(22) Filed: Apr. 22, 2010

(65) Prior Publication Data

US 2010/0272428 A1  Oct. 28, 2010

Related U.S. Application Data

(60) Provisional application No. 61/171,845, filed on Apr. 23, 2009.

(51) Int. Cl.
*G03B 29/00* (2006.01)

(52) U.S. Cl. .......................... 396/428; 396/426; 396/429

(58) Field of Classification Search .................. 396/419, 396/426, 428, 429; 248/183.2, 418
See application file for complete search history.

(56) References Cited

U.S. PATENT DOCUMENTS

| 4,643,159 | A  | * | 2/1987  | Ryan ............................... 124/88 |
| 4,890,128 | A  | * | 12/1989 | Kania ............................ 396/426 |
| D425,540  | S  | * | 5/2000  | Hubbell ....................... D16/242 |
| 6,286,796 | B1 | * | 9/2001  | Pugliesi ....................... 248/187.1 |
| 6,425,697 | B1 | * | 7/2002  | Potts et al. .................... 396/426 |
| 7,604,420 | B2 | * | 10/2009 | Moody et al. ................ 396/419 |
| 7,614,805 | B2 | * | 11/2009 | Showalter ..................... 396/428 |
| 8,024,884 | B2 | * | 9/2011  | Holmberg ....................... 42/124 |

* cited by examiner

*Primary Examiner* — Clayton E Laballe
*Assistant Examiner* — Leon W Rhodes, Jr.
(74) *Attorney, Agent, or Firm* — Michael Ries

(57) ABSTRACT

The present invention is a multi-directional camera mount device for mounting a camera onto a compound bow to facilitate movement and positioning of the camera. The camera mount device includes a generally planar camera base bow bracket and a generally planar and elongated camera mount swing arm that is swingably and permanently attached to the bracket. There is also a first attachment assembly to swingably and permanently attach the arm to the bracket, a second attachment assembly to attach the camera to the arm and a swingable assembly that allows swingable movement of the arm and the attached camera.

14 Claims, 4 Drawing Sheets

MULTI-DIRECTIONAL CAMERA MOUNT DEVICE FOR A COMPOUND BOW

This application claims priority to U.S. Provisional Application 61/171,845 filed on Apr. 23, 2009, the entire disclosure of which is incorporated by reference.

TECHNICAL FIELD & BACKGROUND

The present invention generally relates to a multi-directional camera mount device. More specifically, the invention is a multi-directional camera mount device for a compound bow.

It is an object of the invention to provide a multi-directional camera mount device for a compound bow for both a left-handed and right-handed user that is easily moveable into an optimal position for self-recording the user's practice or hunting activities.

What is really needed is a multi-directional camera mount device that can be used with a still or video camera for a compound bow that can be easily moved and positioned to assist a user with self-recording their practice or hunting activities.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
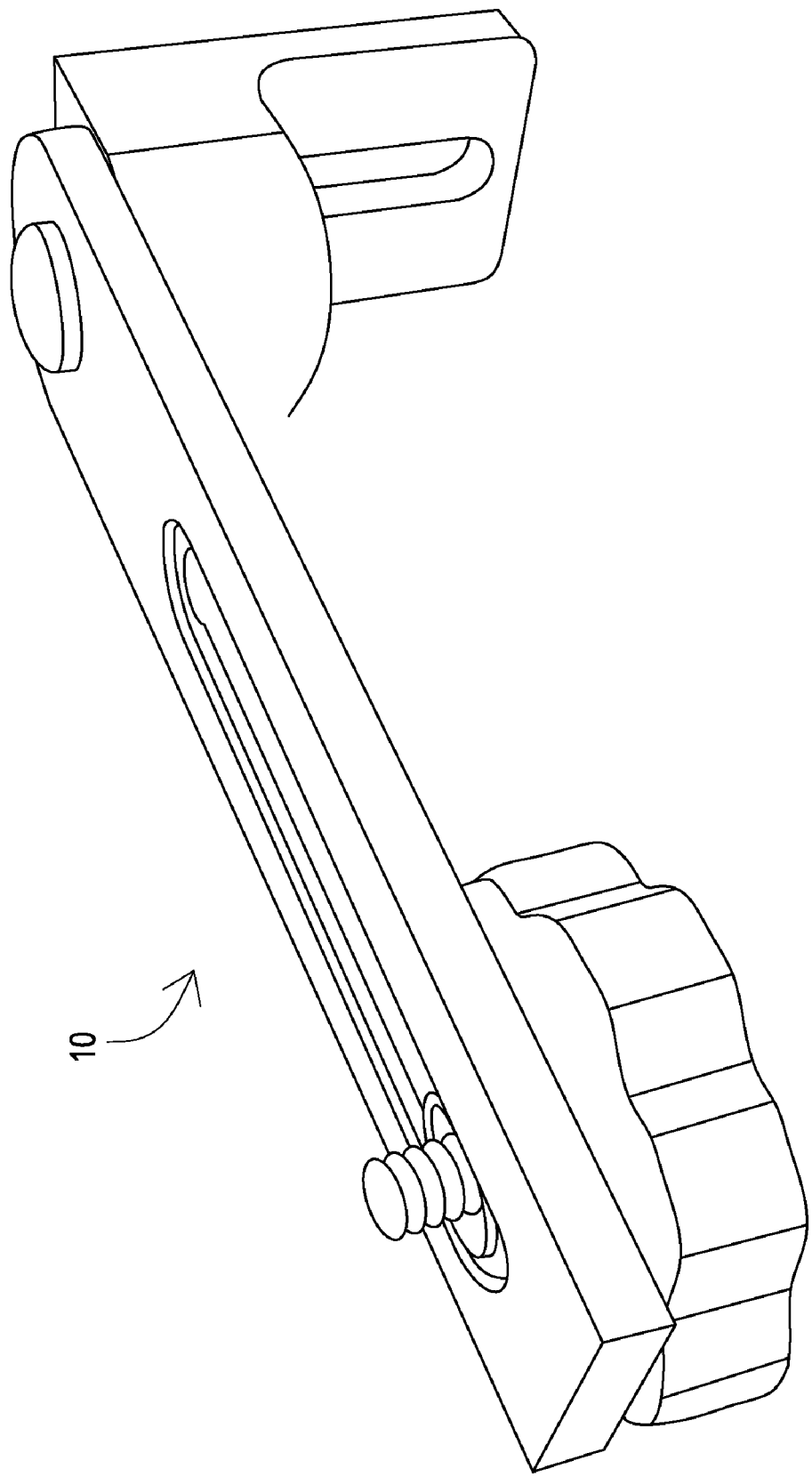
FIG. 1 illustrates a side perspective view of an assembled multi-directional camera mount device for a compound bow, in accordance with one embodiment of the present invention.

FIG. 1 illustrates a side perspective view of an assembled multi-directional camera mount device for a compound bow 10 in accordance with one embodiment of the present invention. The assembled multi-directional camera mount device for a compound bow 10 is made of Black Glass Epoxy and Black Delrin, but can be made of any materials that are well known in the art.

Figure 2:
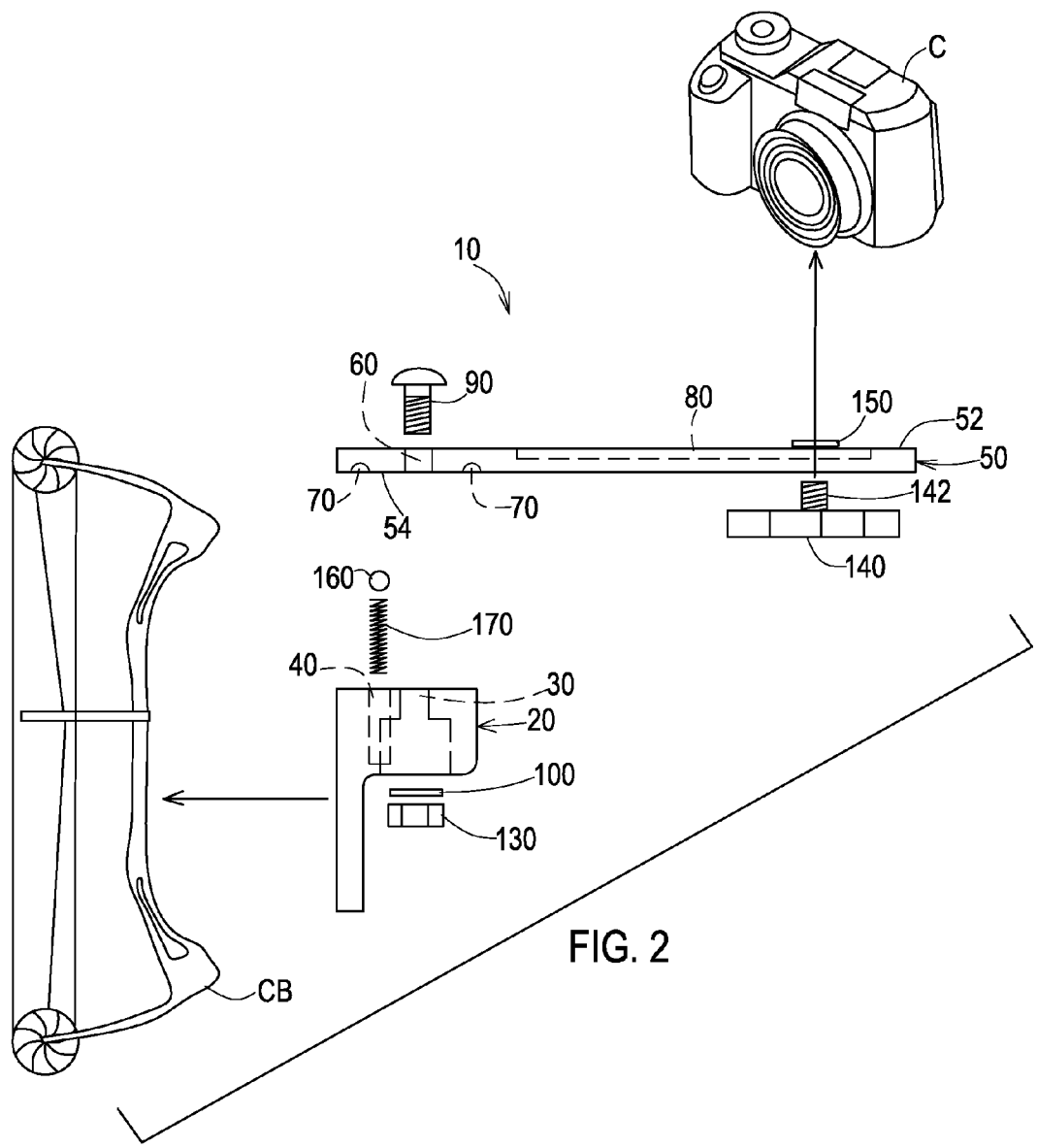
FIG. 2 illustrates an environmental exploded side perspective view of a multi-directional camera mount device for a compound bow, in accordance with one embodiment of the present invention.

FIG. 2 illustrates an exploded side perspective view of a multi-directional camera mount device for a compound bow 10, in accordance with one embodiment of the present invention. The multi-directional camera mount device 10 is used for mounting a camera C onto a compound bow CB and is designed to facilitate movement and positioning of an attached camera C and more specifically to facilitate a user's self-recording of archery and hunting activities. Cameras C that can be attached to the multi-directional camera mount device for a compound bow 10 include a still camera, an instamatic camera, a palm camcorder and any camera with a standard tripod mounting connection, although other cameras C that are well known to those well known in the art can also be attached. The multi-directional camera mount device for a compound bow 10 can also be used by both right-handed and left-handed users.

Figure 3:
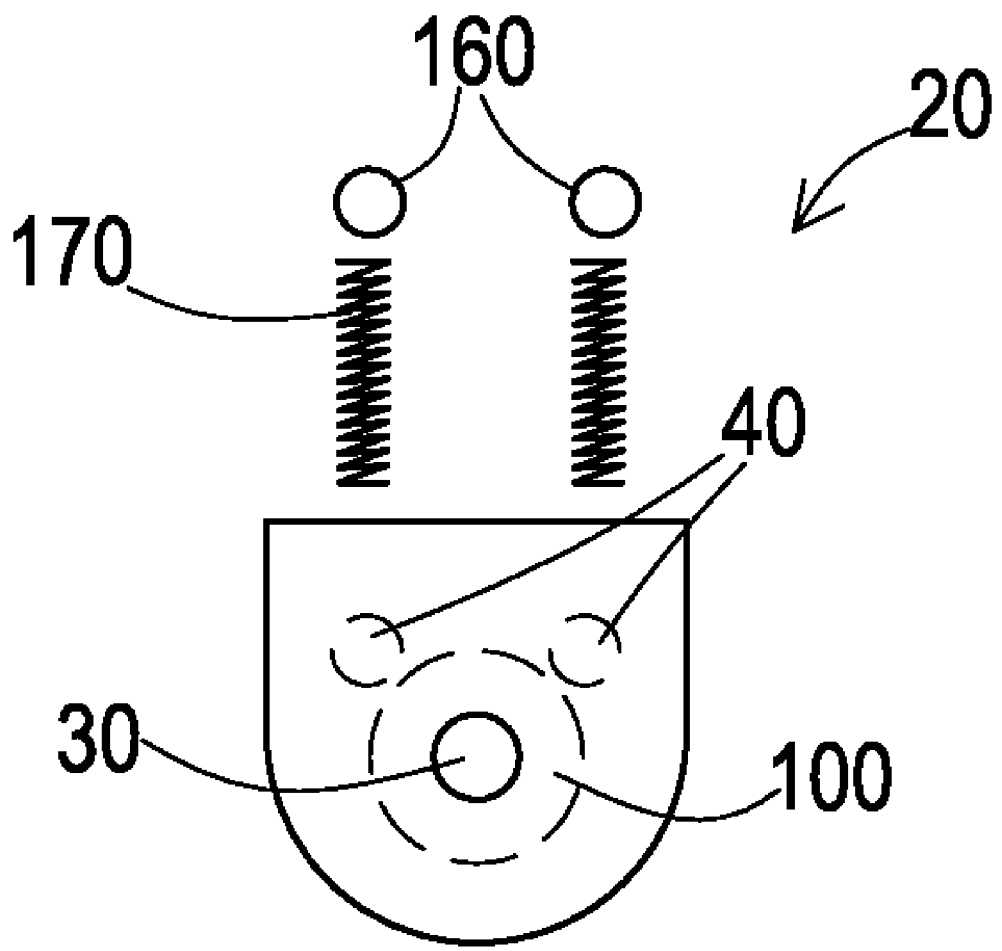
FIG. 3 illustrates an overhead perspective view of a camera mount swing arm of a multi-directional camera mount device for a compound bow, in accordance with one embodiment of the present invention.
Figure 4:
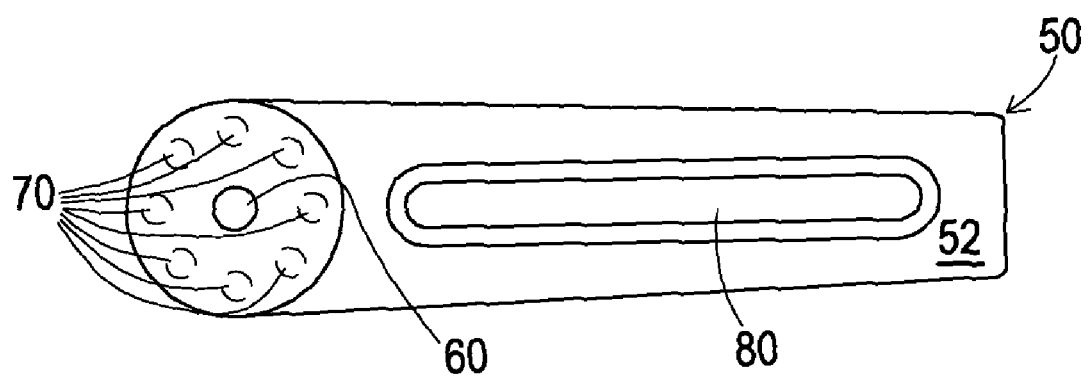
FIG. 4 illustrates an overhead perspective view of a camera base bow bracket of a multi-directional camera mount device for a compound bow, in accordance with one embodiment of the present invention.

One of the two main components of the multi-directional camera mount device for a compound bow 10 is a generally planar camera base bow bracket 20, which is also illustrated in FIG. 3. The camera base bow bracket 20 has a first attachment aperture 30 and a plurality of bearing apertures 40 and is directly attached to the compound bow CB. The second main component of the multi-directional camera mount device for a compound bow 10 is a generally planar and elongated camera mount swing arm 50, which is also illustrated in FIG. 4. The generally planar and elongated swing arm 50 has a top surface 52 and a bottom surface 54, a second attachment aperture 60 that aligns with the first attachment aperture 30 from the camera base bow bracket 20, a plurality of semi-circular indentations 70 that are disposed on the bottom surface 54, set circumferentially around the second attachment aperture 60 and an attachment track 80 that receives the camera C and allows the camera C to change position along the track 80.

There is also a first attachment assembly (no number) for attaching the camera base bow bracket 20 and the generally planar and elongated swing arm 50. The first attachment assembly includes a screw 90 that threads the first attachment aperture 30 and the second attachment aperture 60 that is secured by a washer 100 and a locking nut 130. The first attachment assembly allows for a swingable and permanent attachment of the elongated swing arm 50 to the camera base bow bracket 20. There is also a second attachment assembly (no number) for attaching a camera C to the elongated swing arm 50. The second attaching assembly includes a rosette knob 140 and a socket cap head screw 142 that threads the track 80 and a third attachment aperture of the attached camera C (not shown) that is secured by a corresponding e-clip retaining ring 150. The second attachment assembly allows for a movable and adjustable attachment of a camera C with the generally planar and elongated swing arm 50 and the multi-directional camera mount device for a compound bow 10 and can be reattached anywhere along the track 80.

The multi-directional camera mount device for a compound bow 10 also utilizes a swingable assembly (no number) that is incorporated with the first attachment assembly. The swingable assembly utilizes a plurality of bearings 160 set in the bearing apertures 40 of the base bow bracket 20 and the aligned semi-circular indentations 70 of the elongated swing arm 50 and a plurality of bearing springs 170 to provide contact pressure to the bracket 20 and the arm 50 that allow swingable movement of the arm 50 and the attached camera C.

The multi-directional camera bow mount device 10 was designed to allow the user to easily move the position of the mounted camera C from one side of the compound bow CB to the other without the use of outside tools. This allows for the user to be either left or right handed. The multi-directional camera bow mount device 10 also has 100% captive hardware, which means that the user does not have to worry about dropping or loosing small detachable pieces from the multi-directional camera bow mount device 10. Traditional camera mounts on the market today provide a single fixed position. The camera bow mount device 10 provides a pivoting camera swing arm 50 which allows for a 180° degree range of motion and a total of 5 semi-locking positions. In a hunting scenario, the user is typically either walking to or from a tree stand or blind or stalking an animal in a brushy or wooded area. The semi-locking swing arm 50 of the camera bow mount device 10 allows for the camera C to be positioned out of harm's way while walking or stalking and is then easily moved back into the optimal position when necessary or required.

This swing arm capability also allows for the camera mount device 10 to be permanently attached to the compound bow CB even when a camera C is not attached or being used. The swing arm 50 can be positioned in such a way that it can stay on the compound bow CB even when the compound bow CB is packed in a hard shell travel bow case. This can be done with or without the camera C being attached to the multi-directional camera mount device 10.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A multi-directional camera mount device for mounting a camera onto a compound bow to facilitate movement and positioning of said camera, comprising:
   a generally planar camera base bow bracket with a first attachment aperture and a plurality of bearing apertures that is configured to be attached to said compound bow;
   a generally planar and elongated camera mount swing arm with a top surface and a bottom surface, a second attachment aperture that aligns with said first attachment aperture, a plurality of semi-circular indentations that are disposed on said bottom surface set circumferentially around said second attachment aperture, an attachment track that receives said camera and allows said camera to change position along said track that is swingably and permanently attached to said bracket;
   a first attachment assembly which pivotably connects said first attachment aperture and said second attachment aperture to swingably and permanently attach said arm to said bracket;
   a second attachment assembly with a rosette knob and a socket head cap screw that threads said track and is configured to engage a third attachment aperture of said camera that is secured by a corresponding member to attach said camera to said arm;
   and a swingable assembly with a plurality of bearings set in said bearing apertures and aligned with said semi-circular indentations and a plurality of bearing springs to provide contact pressure to said bracket and said arm that allow swingable movement of said arm and said attached camera.

2. The device according to claim 1, wherein said swingable assembly forms a plurality of interlocking camera positions.

3. The device according to claim 1, wherein said swingable assembly allows for a 180° range of said camera motion.

4. The device according to claim 1, wherein said camera is a selected one of: a still camera, an instamatic camera, a palm camcorder and/or a camera that supports a standard tripod connection.

5. The device according to claim 1, wherein said device is attachable to right-handed and left-handed bows.

6. The device according to claim 1, wherein said device is permanently attached to said compound bow.

7. The device according to claim 6, wherein said device is permanently attached to said compound bow when said compound bow is not in use.

8. A multi-directional camera mount device for mounting a camera onto a compound bow to facilitate a user's self-recording of archery and hunting activities, comprising:
   a generally planar camera base bow bracket with a first attachment aperture and a plurality of bearing apertures that is configured to be attached to said compound bow;
   a generally planar and elongated camera mount swing arm with a top surface and a bottom surface, a second attachment aperture that aligns with said first attachment aperture, a plurality of semi-circular indentations that are disposed on said bottom surface set circumferentially around said second attachment aperture, an attachment track that receives said camera and allows said camera to change position along said track that is swingably and permanently attached to said bracket;
   a first attachment assembly which pivotably connects said first attachment aperture and said second attachment aperture to swingably and permanently attach said arm to said bracket;
   a second attachment assembly with a rosette knob and a socket head cap screw that threads said track and is configured to engage a third attachment aperture of said camera that is secured by a corresponding member to attach said camera to said arm;
   and a swingable assembly with a plurality of bearings set in said bearing apertures and aligned with said semi-circular indentations and a plurality of bearing springs to provide contact pressure to said bracket and said arm that allow swingable movement of said arm and said attached camera.

9. The device according to claim 8, wherein said swingable assembly forms a plurality of interlocking camera positions.

10. The device according to claim 8, wherein said swingable assembly allows for a 180.degree. range of said camera motion.

11. The device according to claim 8, wherein said camera is a selected one of: a still camera, an instamatic camera, a palm camcorder and a camera that supports a standard tripod connection.

12. The device according to claim 8, wherein said device attachable to right-handed and left-handed bows.

13. The device according to claim 8, wherein said device is permanently attached to said compound bow.

14. The device according to claim 13, wherein said device is permanently attached to said compound bow when said compound bow is not in use.

* * * * *